Oct. 9, 1962  R. N. YECKLEY ETAL  3,057,983
CIRCUIT INTERRUPTER
Filed Jan. 23, 1959  9 Sheets-Sheet 1
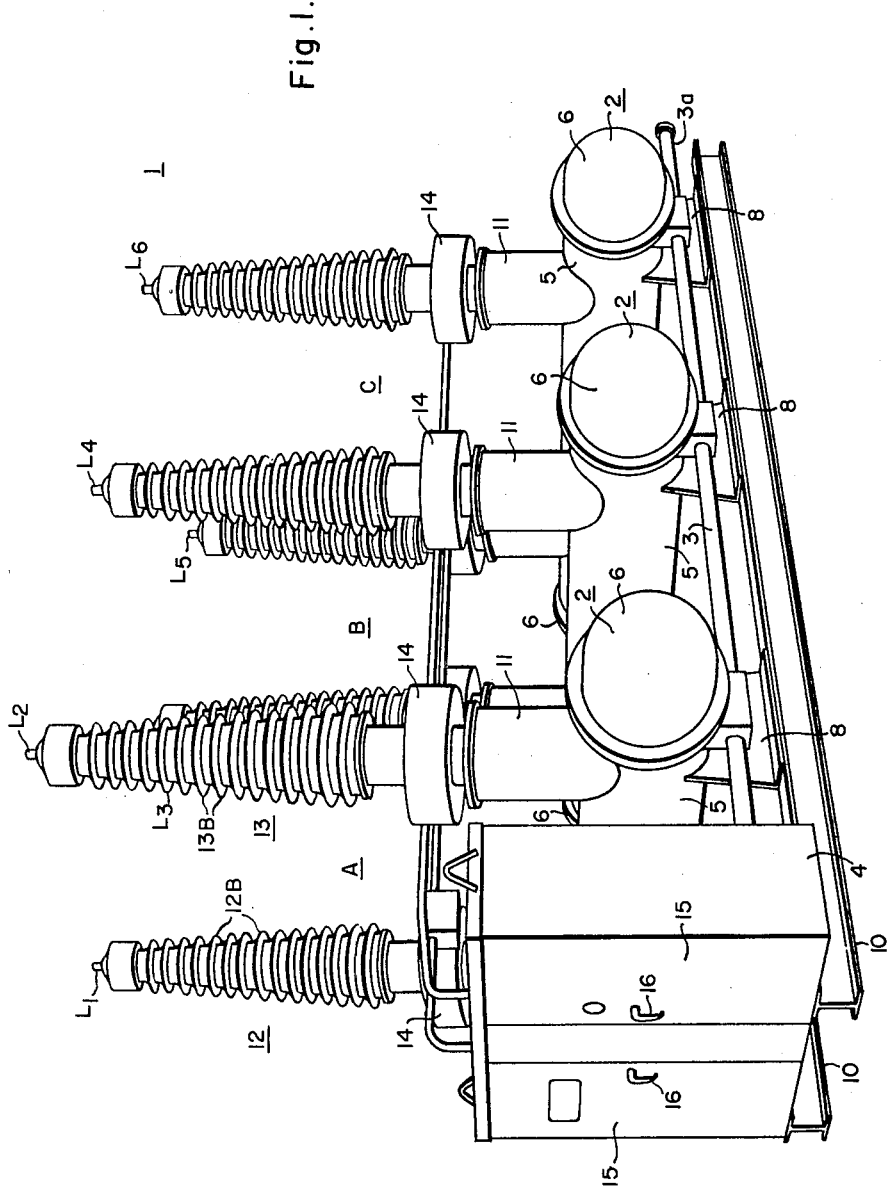

Oct. 9, 1962 R. N. YECKLEY ETAL 3,057,983
CIRCUIT INTERRUPTER
Filed Jan. 23, 1959 9 Sheets-Sheet 2
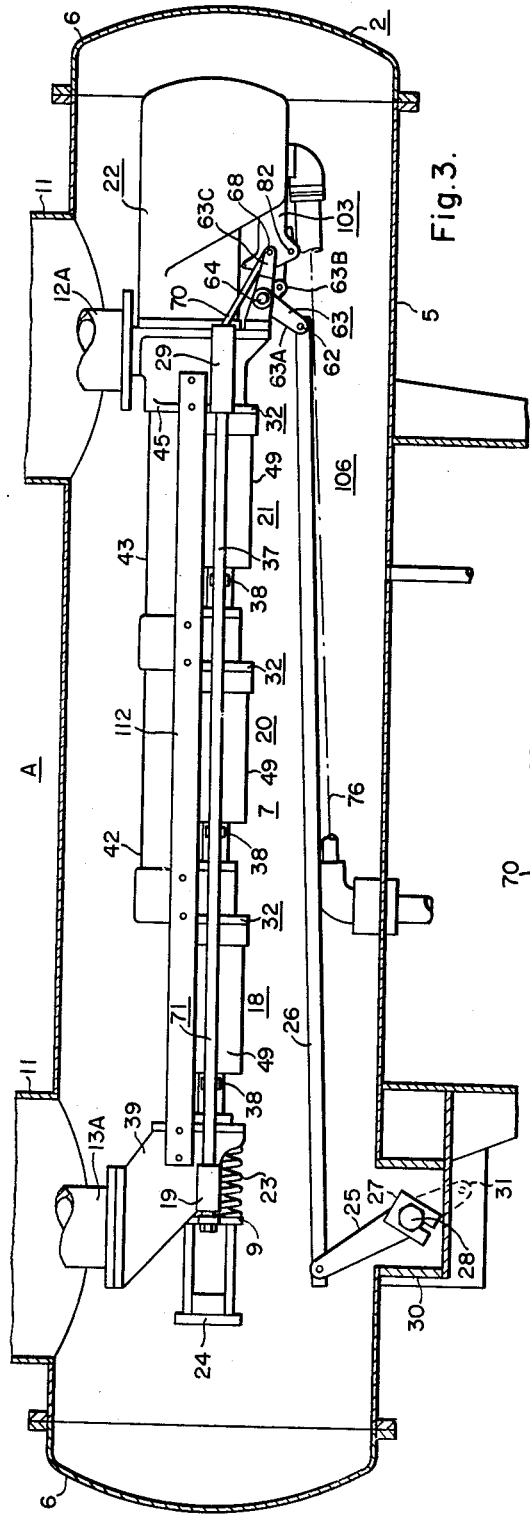
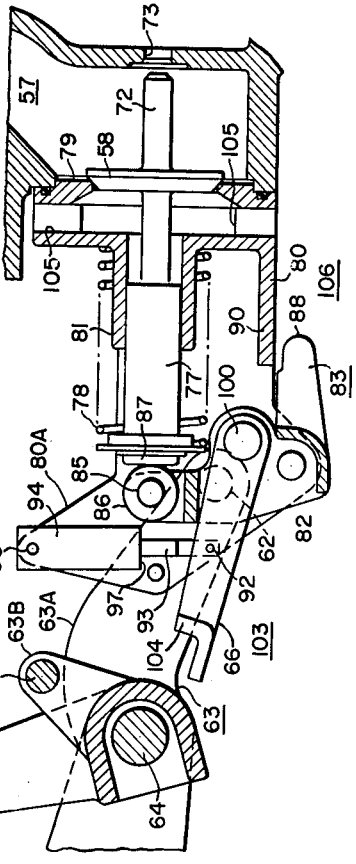

Oct. 9, 1962

R. N. YECKLEY ETAL 3,057,983

CIRCUIT INTERRUPTER

Filed Jan. 23, 1959

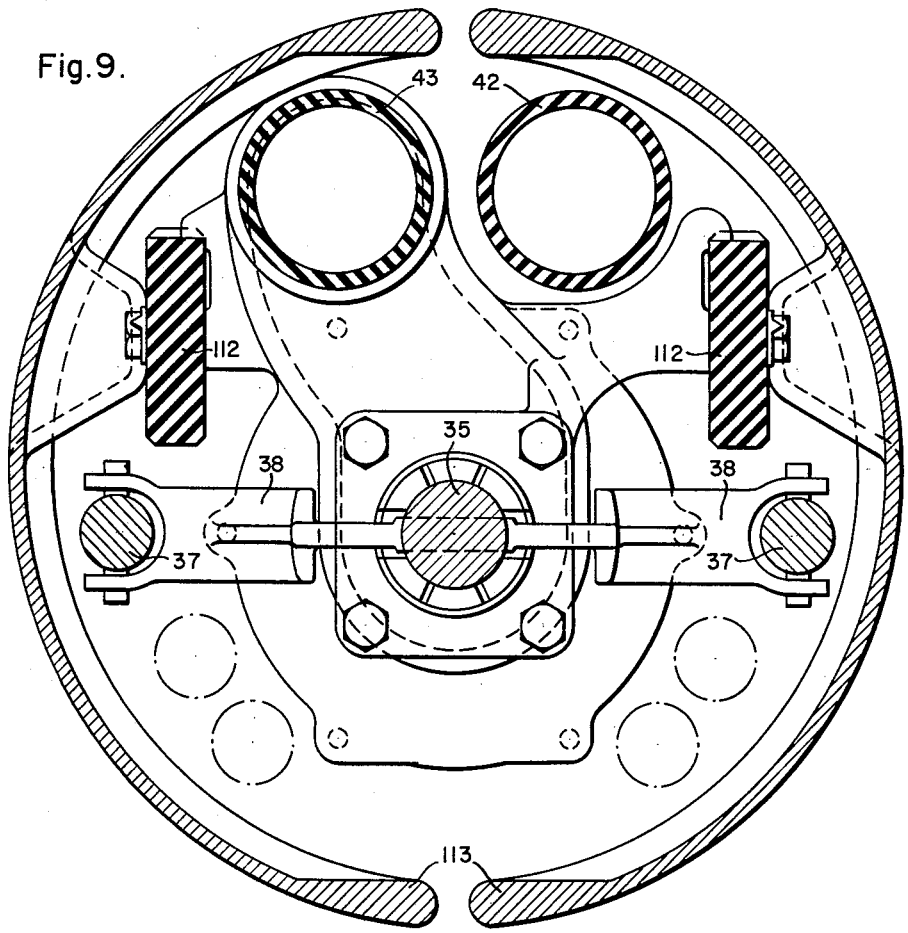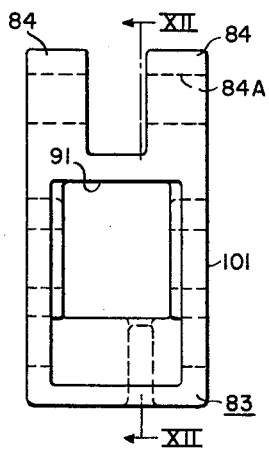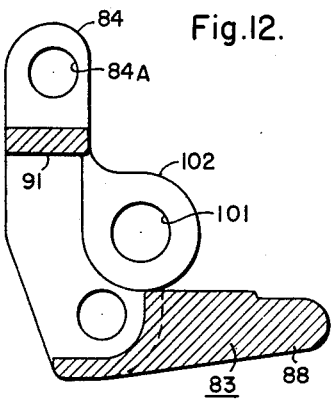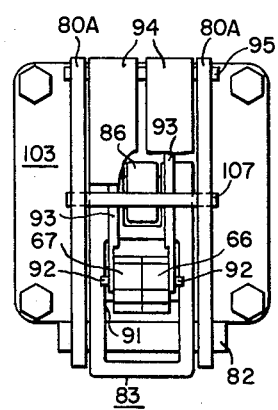

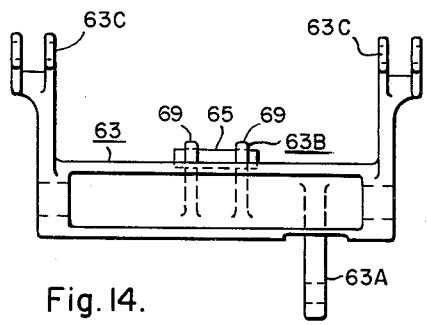
Fig. 14.
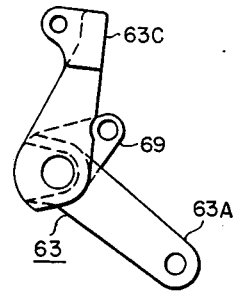
Fig. 15.
Fig. 10.
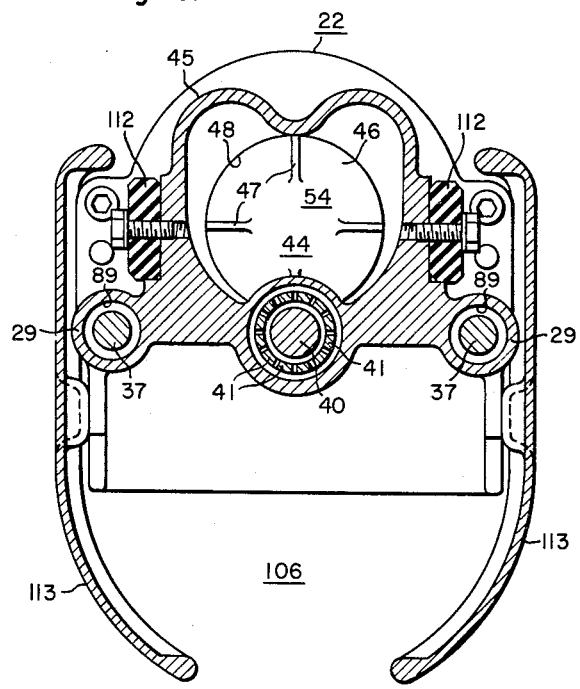
Fig. 16.
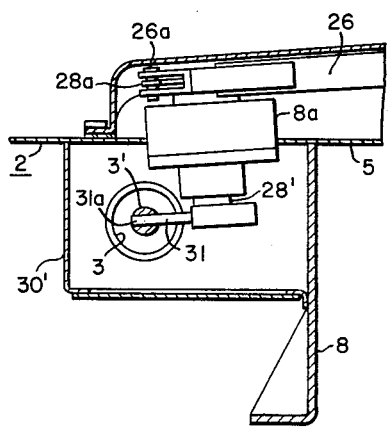

United States Patent Office 3,057,983
Patented Oct. 9, 1962

3,057,983
CIRCUIT INTERRUPTER
Russell N. Yeckley, Monroeville, Joseph Sucha, Port Vue, and Benjamin P. Baker, deceased, late of Monroeville, Pa., by Mellon National Bank and Trust Co., executor, assignors to Westinghouse Electric Corporation, East Pittsburgh, Pa., a corporation of Pennsylvania
Filed Jan. 23, 1959, Ser. No. 788,668
31 Claims. (Cl. 200—145)

This invention relates to fluid-blast circuit interrupters in general, and, more particularly, to arc-extinguishing structures, operating blast-valve arrangements, and improved mounting arrangements for such circuit interrupters.

A general object of the present invention is to provide an improved circuit interrupter, which will be adaptable for performing more effectively over wider voltage and current ranges than circuit interrupters heretofore employed in the industry.

Another object of the invention is to provide an improved mounting arrangement for a circuit interrupter, in which maintenance operations may be readily performed at a convenient working level or height for the operating personnel.

Another object of the invention is to provide an improved three-phase circuit interrupter, in which the three pole units are mechanically interconnected in an improved manner for simultaneous operation.

A further object of the invention is to provide an improved high-power circuit interrupter of the fluid-blast type, in which a plurality of serially related arc-extinguishing units are employed, utilizing a single high-pressure reservoir chamber, and a single blast valve for improved operation.

A further object of the invention is the provision of an improved gas-blast type of circuit interrupter, having an improved and simplified gas-blast valve operating mechanism.

Another object of the invention is the provision of an improved, dual-pressure type of fluid-blast circuit interrupter, in which the arrangement of the several parts is such as to provide a simplified and mechanically compact construction.

Another object of the invention is an improved pilot-valve operating linkage for a compressed-gas circuit interrupter, which initiates blast-valve opening very early in the contact opening stroke, and permits its reclosing at a predetermined point in the opening stroke.

A further object of the invention is an improved pilot-valve operating linkage of the type set forth in the immediately preceding paragraph, in which more than one operating pilot-valve latches are employed in the pilot-valve operating linkage, one resetting earlier in the contact closing stroke, and thus acting as a backstop in the event of maladjustment or incomplete closure of the circuit interrupter.

Another object of the invention is an improved seal for an operating member which extends through the wall of a circuit interrupter tank.

Another object of the invention is the provision of an improved seal for a fluid-blast type of circuit interrupter, in which a pressurized tank is employed, and an operating member extends into the interior of such pressurized tank from the outside thereof.

A further object of the invention is the improved positioning, or disposition, of the several parts of a multibreak arc-extinguishing assemblage within a tank structure, so arranged that ready removal thereof out of such tank structure may be quickly and easily performed.

An auxiliary object of the invention is the provision of an improved high-power, gas-blast circuit interrupter of the type involving a high-pressure reservoir at one end of an arc-extinguishing assemblage, in which a high-pressure gas supply line substantially parallels the operating rod, which effects blast-valve operation, to balance the tensile and compressive operating forces exerted along such operating rod.

Another object is the provision of an improved circuit interrupter arrangement, as set forth in the immediately preceding paragraph, in which the multibreak arc-extinguishing assemblage is suspended from the lower interior ends of a pair of terminal bushings within a generally elongated tank, the structure operating to minimize cantilever stresses exerted upon the terminal bushings.

Yet a further object of the present invention is the provision of an improved multibreak arc-extinguishing assemblage employing one or more electrostatic shields, associated with the high-voltage multibreak arc-extinguishing assemblage, to minimize the possibility of flash-over between the high-voltage metallic parts of the multibreak arc-extinguishing assemblage and the surrounding grounded tank structure.

Another object of the invention is the provision of an improved contact operating arrangement for a multibreak circuit interrupting assemblage particularly adapted for high-power usage.

In United States patent application filed April 29, 1958, Serial No. 731,706, now U.S. Patent 3,033,962 issued May 8, 1962, to Robert E. Friedrich and Harry J. Lingal, entitled "Circuit Interrupters," and assigned to the assignee of the instant application, there is disclosed an improved, high-power, fluid-blast type of circuit interrupter, utilizing a plurality of serially related arc-extinguishing units, each of which had associated therewith a high-pressure gas reservoir chamber, and the several gas reservoir chambers had a plurality of blast valves associated therewith, which were simultaneously operated by the movable contact operating structure. It is a further object of the present invention to considerably simplify the arc-extinguishing assemblage of the aforesaid Friedrich and Lingal patent application.

It is also another object of the present invention to provide an improved, multiple-pole, operating rod arrangement, which results in a considerable simplification over the movable contact operating arrangement of the aforesaid Friedrich and Lingal application, particularly rendering such a device suitable for such high-power applications, involving voltages up to and over 230 kv., and applicable to power ratings such as 15,000 mva. or higher.

It is an additional object of the present invention to provide an improved circuit interrupter, adaptable to multiple interrupting unit construction, such that it may form a complete line of circuit breakers, differing only in the number of units employed and in spacing distances.

Further objects and advantages will readily become apparent upon reading the following specification, taken in conjunction with the drawings, in which:

FIG. 1 is a perspective view of a three-pole fluid-blast circuit interrupter, embodying features of the present invention and adapted for the control of a three-phase transmission line;

FIG. 2 illustrates a front end elevational view of the three-phase circuit interrupter of FIG. 1;

FIG. 3 is a somewhat enlarged, fragmentary, vertical sectional view, with the arc-extinguishing assemblage shown in side elevation, taken through one of the grounded, tank structures of FIG. 1, with the contact structure illustrated in the closed-circuit position and the tank structure being shown reversed from its position illustrated in FIG. 1;

Figures 4A, 8:
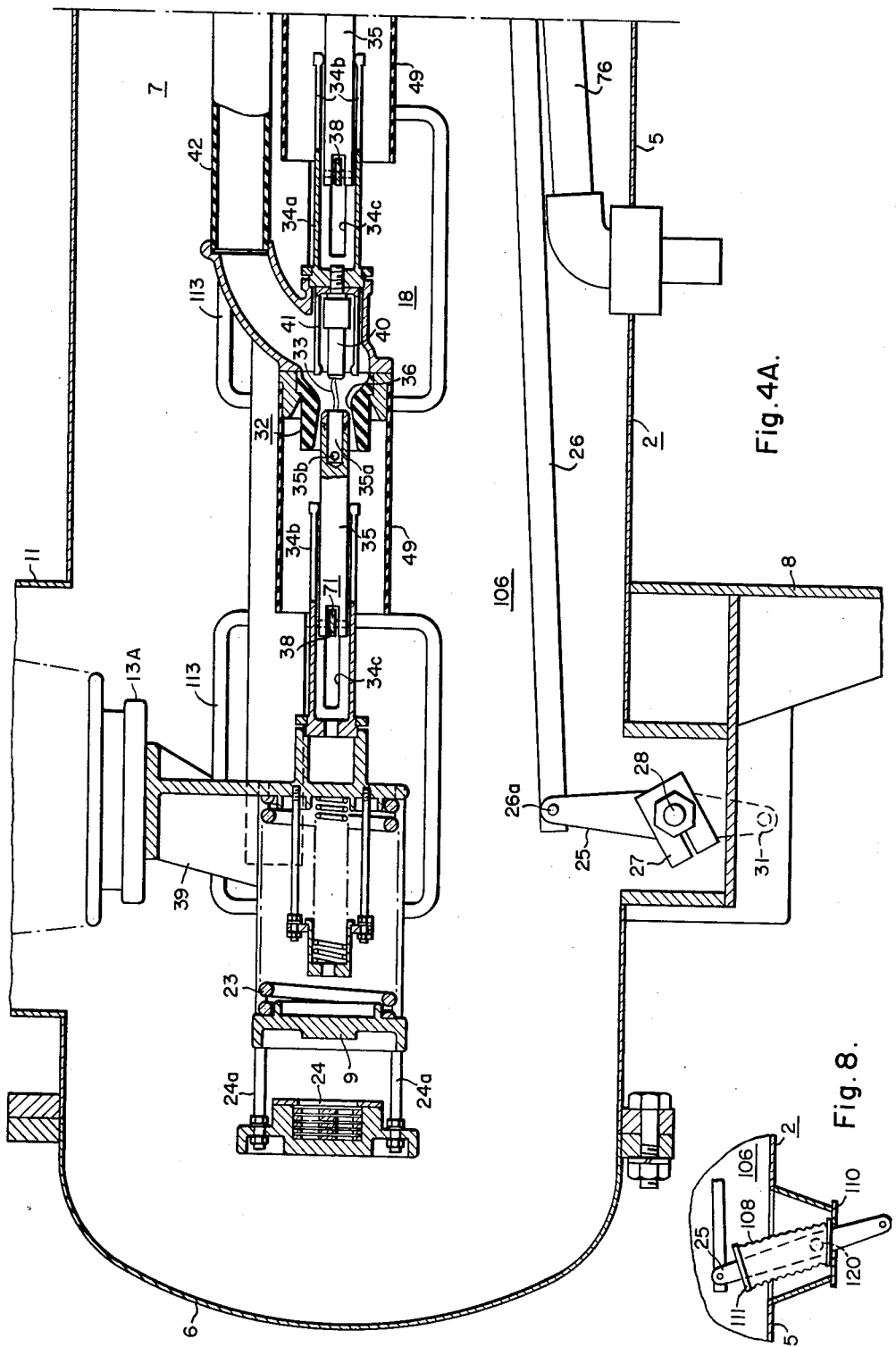
Figure 4B:
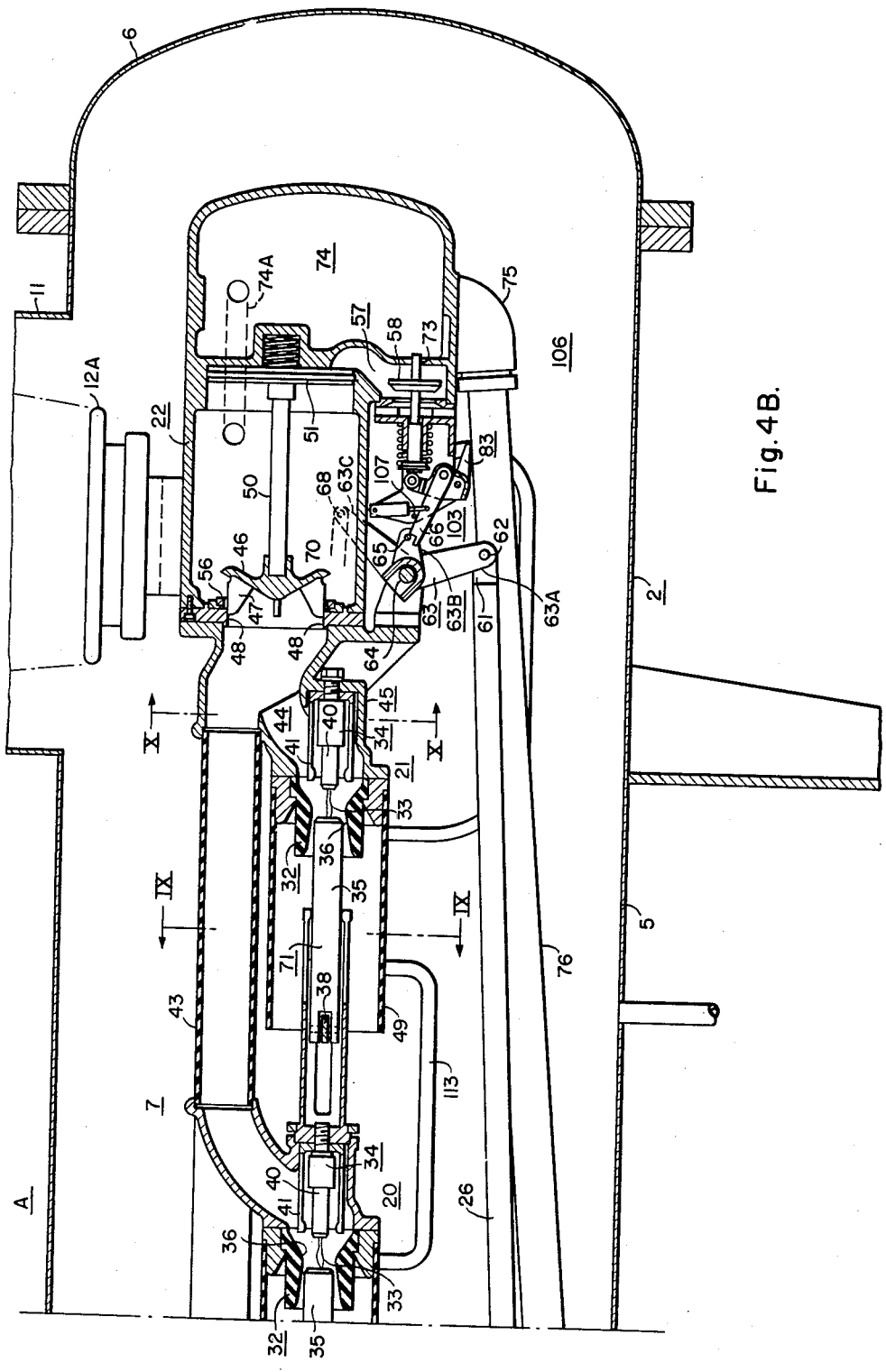
Figures 5, 7:
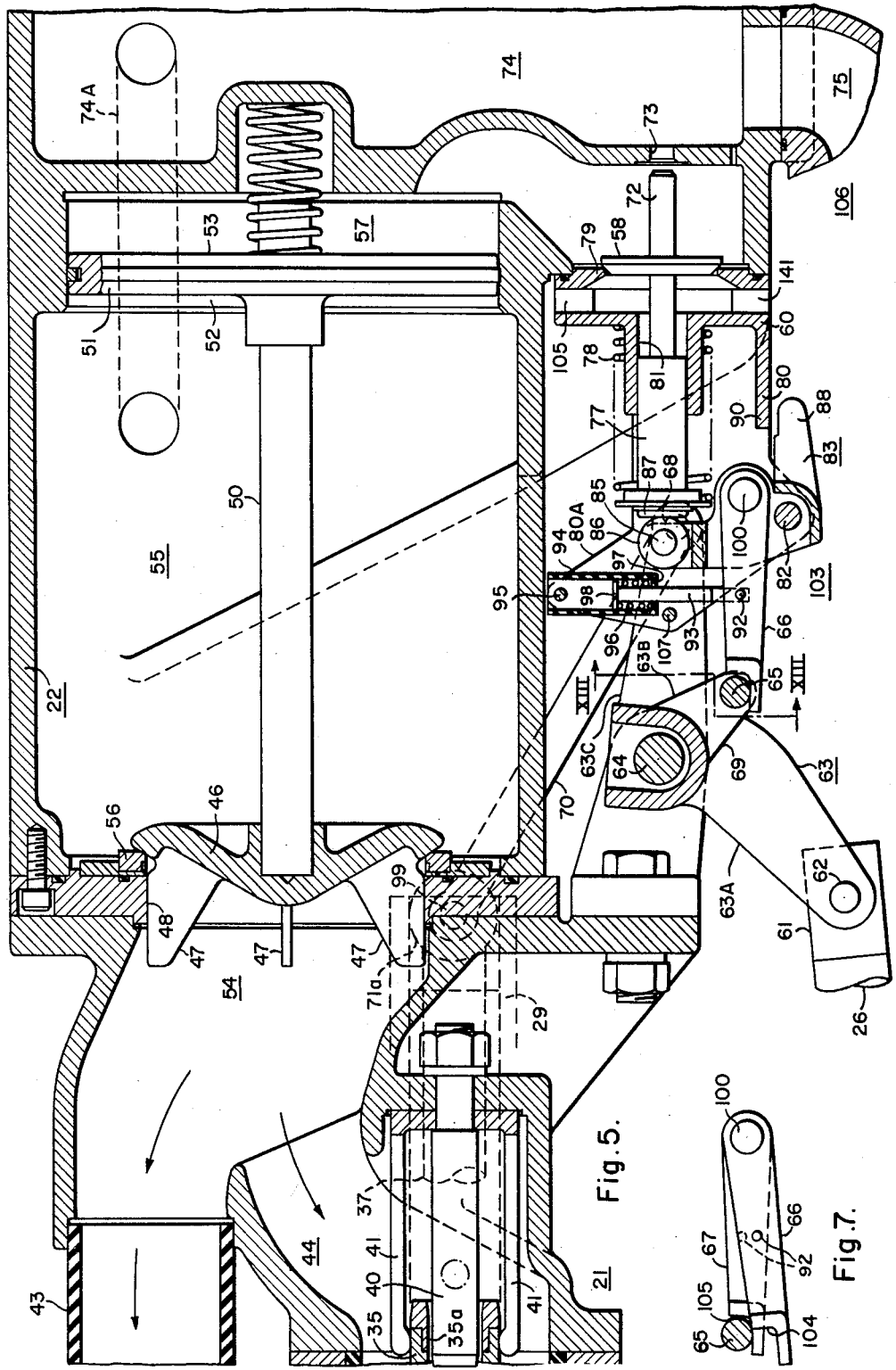
Figure 17:
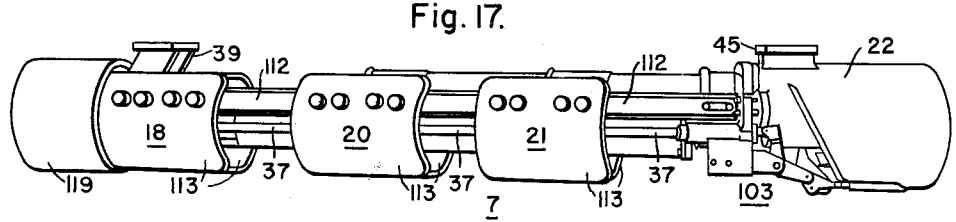
Figure 18:
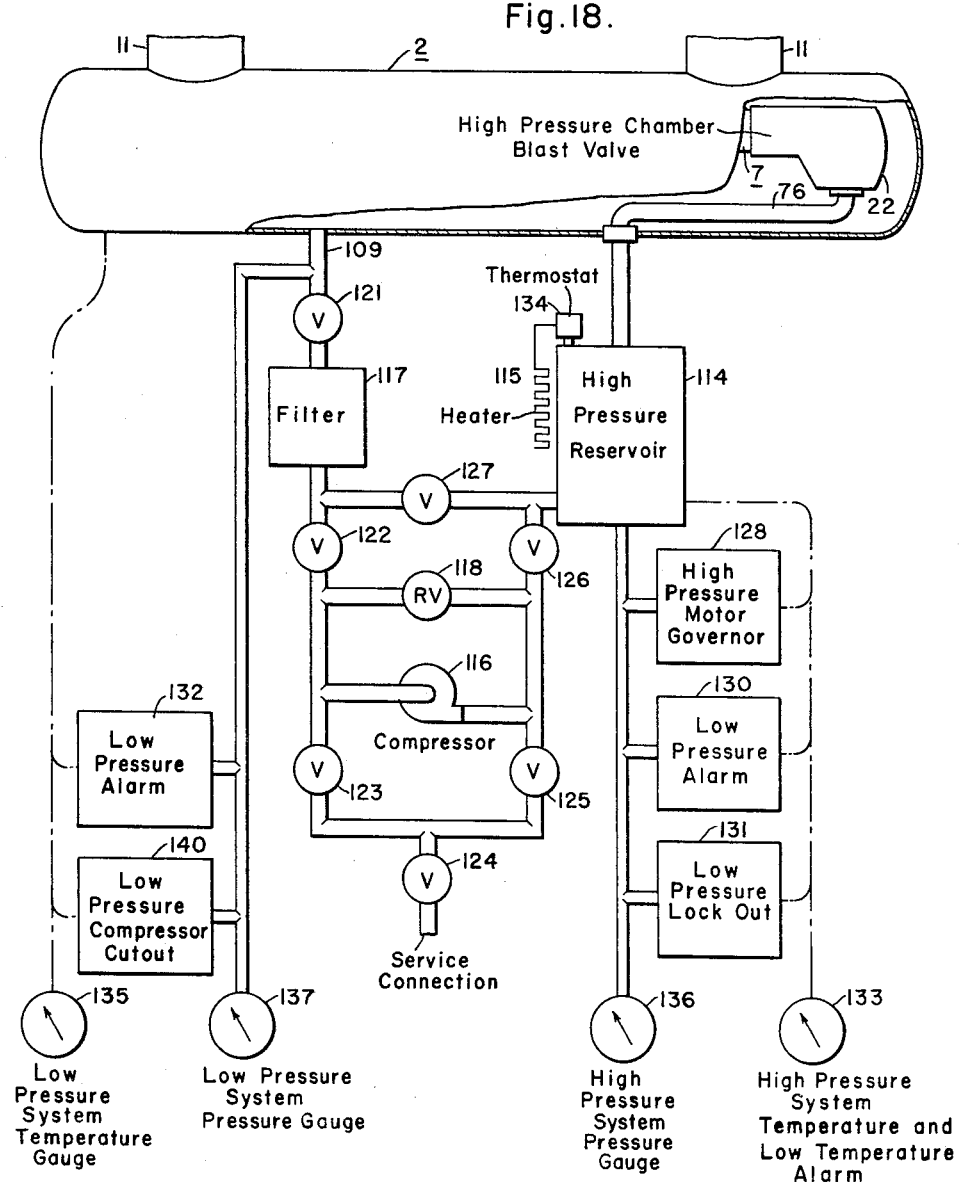
Figure 19:
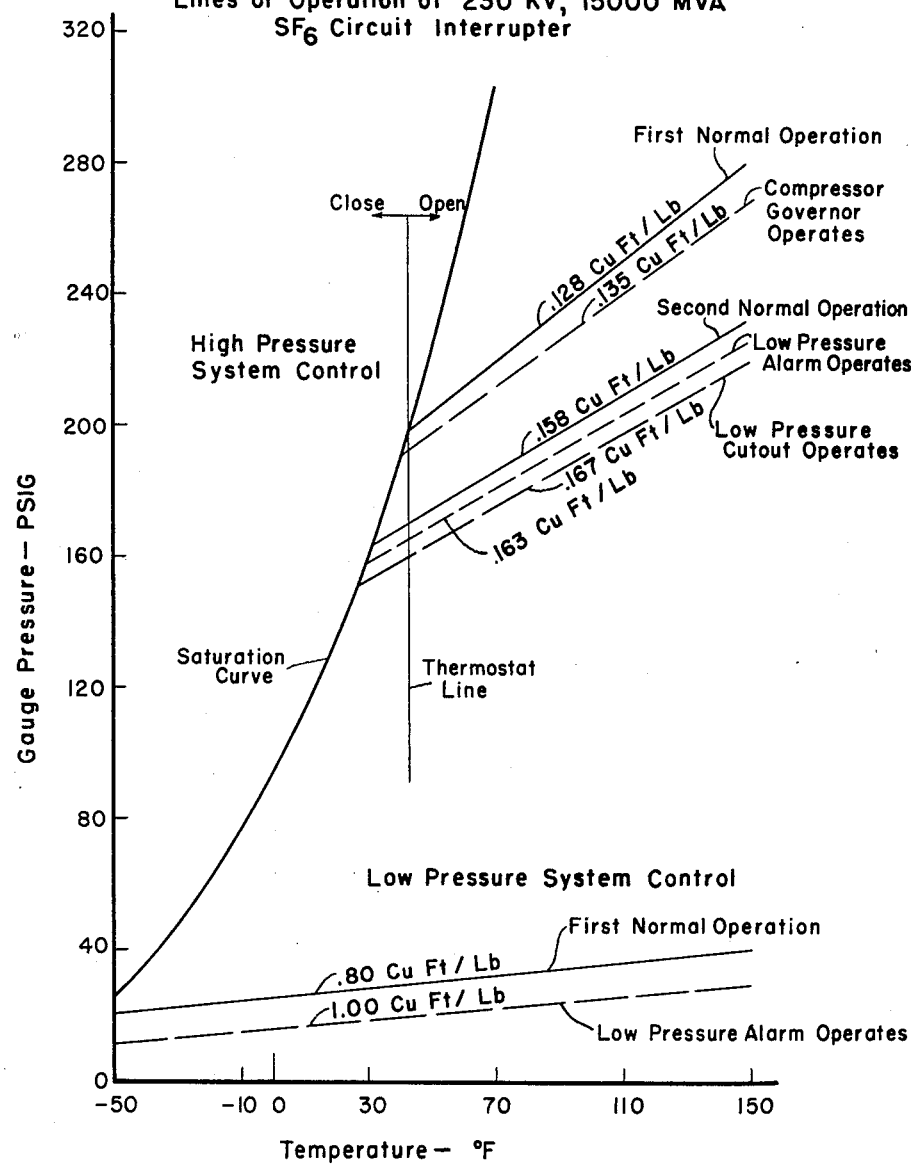

FIGS. 4A and 4B collectively illustrate, on a considerably enlarged scale, a vertical sectional view taken through the improved arc-extinguishing assemblage of the invention, illustrating the position of the several parts during an opening operation, with the contacts separated, and the blast valve open;

FIG. 5 is a considerably enlarged, vertical sectional view taken through the high-pressure gas reservoir chamber of the arc-extinguishing assemblage, illustrating the position of the several parts in the contact-closed position, with the blast valve also shown closed;

FIG. 6 is a fragmentary view, somewhat similar to FIG. 5, but illustrating the position of the contact operating mechanism, and the pilot-valve structure in the fully open-circuit position of the circuit interrupter;

FIG. 7 is a fragmentary detailed view showing the pair of cooperable pilot-valve latches employed, having different resetting positions;

FIG. 8 fragmentarily illustrates a modified type of sealing arrangement, for bringing motive power into a tank structure, such as a pressurized tank structure, from an external source, the parts being shown in the contact-closed position;

FIG. 9 is an enlarged, vertical sectional view taken along the line IX—IX of the arc-extinguishing assemblage illustrated in FIG. 4B;

FIG. 10 is a vertical sectional view taken through the arc-extinguishing assemblage of FIG. 4B substantially along the line X—X thereof;

FIG. 11 is a front end elevational view of the rotatable pilot-valve lever;

FIG. 12 is a vertical sectional view taken along the line XII—XII of the pilot-valve lever of FIG. 11;

FIG. 13 is an end elevational view of the pilot-valve operating assembly, taken substantially along the line XIII—XIII of FIG. 5;

FIG. 14 is an end elevational view of the rotatable actuating lever casting employed to effect contact motion and blast-valve operation;

FIG. 15 is a side elevational view of the lever casting of FIG. 14;

FIG. 16 is a fragmentary view of the sealing shaft arrangement for the main operating shaft extending into the circuit-interrupter tank structure, when a number of separate pole units are employed, as shown in FIG. 1;

FIG. 17 is a side elevational view, drawn in perspective, of the complete multibreak arc-extinguishing assemblage, as removed from the tank structure, with the several parts being illustrated in the open-circuit position;

FIG. 18 is a schematic diagram of the gas system for the dual-pressure fluid-blast circuit interrupter of FIG. 1, as applied to a 230 kv., 15,000 mva. circuit interrupter, as an example; and FIG. 19 is a graph showing the saturation curve of pressure against ambient temperature for sulfur hexafluoride ($SF_6$), showing the relative operating pressures and temperatures for the various control instruments during normal operation of the circuit interrupter of the present invention.

Referring to the drawings, and more particularly to FIG. 1 thereof, the reference numeral 1 generally designates a high-voltage, high-power, fluid-blast circuit interrupter, adaptable for the control of a three-phase transmission circuit, whose lines are indicated by the reference characters $L_1$, $L_2$, $L_3$, $L_4$, $L_5$, $L_6$. As noted in FIG. 1, there is provided an elongated tank structure 2 for each pole unit of the circuit interrupter 1. The pole units may generally be designated by the letters A, B and C. The pole units are identical in construction; consequently, a description of the operation of one pole unit, for instance pole unit A, will suffice for an understanding of the operation of pole units B and C, which are identical. As illustrated in FIG. 1, a weatherproof enclosing tube 3 encloses an axially movable operating rod 3', shown in FIG. 16, which mechanically interconnects the three pole units A, B and C for simultaneous operation, so that there is no relaying difficulty. An accelerating spring housing 3a is disposed at the end of the stationary weatherproof tube 3, within which is disposed an opening accelerating spring, which biases the enclosed operating rod 3' to the right, as viewed in FIG. 1.

A mechanism and gas-control housing 4 is disposed adjacent to the tank structure 2 of front pole unit A, and not only houses a rather conventional pneumatic mechanism for effecting the axial motion of the enclosed operating shaft 3' within tube 3, but also the housing 4 encloses the equipment for maintaining the dual-pressure, gas-supply system at the desired pressures.

Each of the tank structures 2 includes a generally horizontally extending, cylindrical tank portion 5, which has a pair of hinged closure caps 6 at its opposite ends. The hinged closure caps, or heads 6, may be swung to an open position about their hinges, to permit the lateral withdrawal of an arc-extinguishing assemblage 7 (FIG. 17) from the tank structure 2 during maintenance operations.

Each tank structure 2 is preferably supported by flange plates 8, which may be welded to longitudinally extending steel beams 10, which extend beneath all three pole units A, B and C. Thus, a crane may be employed to bodily lift the pair of steel beams 10, together with the several tank structures 2 and the housing 4, to permit the bodily placement of the circuit interrupter 1 upon a mounting slab of concrete, or the like, as well known by those skilled in the art.

FIG. 1 also shows a pair of upstanding cylindrical steel positioning supports 11, disposed adjacent opposite ends of the centrally situated cylindrical tank portion 5, to permit the mounting of a pair of terminal bushings, generally designated by the reference numerals 12, 13, to the lower internal ends 12A and 13A (FIG. 3) of which is detachably secured the longitudinally extending multibreak arc-extinguishing assemblage 7. The view of the tank structure 2 in FIG. 3 is reversed from the view of FIG. 1.

Through-type current transformers 14 encircle the terminal bushings 12, 13 of FIG. 1 to provide relaying protection, as is well known by those skilled in the art. There is sufficient clearance between the inner diameter of the current transformers 14 and the weather sheds 12B, 13B that the current transformers 14 may be easily placed over the terminal bushings 12, 13 to their mounted position.

FIG. 2 illustrates, to a smaller scale, a front elevational view of the circuit interrupter 1. It will be noted that the mechanism housing 4 has hinged doors 15, opened by handles 16. The position of the steel beams 10 upon a concrete mounting slab 17 is shown. Actually, the circuit interrupter 1, which is of the fluid-blast type, because of its light weight and portability, may be placed upon mounting slabs 17 previously employed for oil circuit interrupters of the tank type for the same voltage and current rating. In addition, the fluid-blast circuit interrupter 1 of the present invention is of such unusually small size, compared to conventional fluid-blast circuit breakers of the prior art, that its dimensions enable the substitution of it for oil circuit breakers of the same rating.

With reference to FIG. 3, it will be observed that the longitudinally extending, multibreak arc-extinguishing assemblage 7 extends substantially coaxially along the center of the central cylindrical portion 5 of the tank structure 2. Generally, the multibreak, arc-extinguishing assemblage 7 includes, for this particular current and voltage rating, namely 230 kv., 15,000 mva., three serially-related arc-extinguishing units 18, 20 21. Also, a high-pressure gas reservoir chamber 22 is disposed at the right-hand end of the arc-extinguishing assemblage 7, as viewed in FIG. 3.

An opening accelerating compression spring 23 is provided at the left-hand end of the arc-extinguishing assemblage 7, as viewed in FIG. 3, with a shock-absorbing stationary bumper 24 provided, to relieve the assemblage 7 of any shock at the end of the opening operation. It will be noted that accelerating spring 23 assists the accelerating spring enclosed within spring housing 3a shown in FIG. 1. Also, the shock absorber 24 is only auxiliary to a main shock absorber, not shown, disposed within housing 4 and associated with the pneumatic operating mechanism therein.

Generally, the operating mechanism is such as to effect counterclockwise rotation of an operating lever 25, during the closing operation, to exert tension upon an insulating operating rod 26, to close the several movable contact structures associated with arc-extinguishing units 18, 20 and 21 and to charge the accelerating compression spring 23. The operating lever 25 is fixedly secured, by a clamp 27, to a hexagonal operating shaft 28 which passes, by way of a gas-tight seal through the side wall of a mechanism box 30, to the outside of the tank structure 2. An externally extending operating lever 31 is fixedly secured to the hexagonal operating shaft 28, so as to effect rotation thereof. Although FIG. 3 shows a horizontally rotatable main operating shaft 28 to more clearly show the relative movement of the parts, nevertheless for multiple pole operation, as shown in FIG. 1, a vertically rotatable main operating shaft 28' is preferably employed, as shown in FIG. 16. The shaft 28' may rotate 90° in its travel. Thus, FIG. 16 shows a vertically positioned rotatable main operating shaft 28' having an external arm 31' pinned, at 31a, to the longitudinally extending operating rod 3', which interconnects the several pole units A, B and C. The seal 8a about rotatable shaft 28' preferably comprises a plurality of resilient O-rings under pressure. An interiorly disposed lever arm 28a clamped to, and rotatable with, the inner end of main shaft 28' is pinned, as at 26a, to the end of insulating operating rod 26.

With reference to FIGS. 4A and 4B, which collectively illustrate, in an enlarged manner, the arc-extinguishing units 18, 20, and 21, it will be observed that they are generally of the orifice type, each arc-extinguishing unit having an orifice structure 32 associated therewith, which directs a longitudinal blast of gas along the arcs 33, which are established between the relatively stationary contact structure 34 and the movable rod-shaped contacts 35. Insulating gas-directing tubes 49 may be supported by the orifice structures 32, as shown, to assist in additionally directing the gas blast during the opening operation.

The longitudinal blasting of the gaseous fluid through the restricted orifices 36, of the orifice structures 32 effects rapid extinction of the arcs 33, and continued leftward movement of the movable contacts 35, from the partially open-circuit position, shown in FIGS. 4A and 4B, results in the interpositioning of three isolating gaps into the circuit for each pole unit A, B and C.

The three movable rod-shaped contacts 35 are simultaneously opened and closed by virtue of the fact that they form part of a movable, ladder-shaped structure including a pair of longitudinally extending insulating operating rods 37 (FIG. 9), transversely extending yokes, or braces 38, to the center of which are secured the movable rod-shaped contacts 35. Note FIG. 9 in this connection. Actually, an end portion 35a of the rod-shaped movable contact 35 is tubular, as shown in FIG. 4A, to accommodate, with clearance, the entrance of a rod-shaped arc-horn extension 40, associated with the relatively stationary contact structure 34. A cluster of resilient spring fingers 41, also constituting a portion of stationary contact structure 34, press inwardly upon the outer sides of the movable contacts 35, carrying current flow therebetween in the closed-circuit position, as shown in FIG. 3.

The tubular ends 35a of movable rod-shaped contacts 35 together with side venting apertures 35b permit compressed fluid to flow through tubular portion 35a, thus centering the arc and preventing its attachment to the external surface of the movable contact 35. This is desirable to retain a good contacting surface on the outside for closed-circuit engagement with the finger contacts 41. This construction is claimed in the aforesaid Friedrich and Lingal application.

It will be noted that two of the relatively stationary contact structures 34 have rearwardly extending split finger contact assemblies 34a, with contact fingers 34b, which bear on the ends of the movable contacts 35. The cross-braces 38 move within split portions 34c.

Interconnecting the orifice structures 32 of the arc-extinguishing units 18 and 20 with the high-pressure gas reservoir chamber 22 is a pair of blast tubes 42, 43. The orifice structure 32 of the right-hand arc-extinguishing unit 21 is connected with the high-pressure reservoir chamber 22 by a short blast passage 44, formed as a part of the end casting 45 of the arc-extinguishing assemblage 7. A longitudinally movable blast valve 46, having guide vanes 47, moves along a blast opening 48 of the high-pressure reservoir 22 to control the passage of high-pressure gas along the passage 44 and through the insulating blast tubes 42, 43.

The blast valve 46 is secured to a piston rod 50, to the right-hand end of which, as more clearly shown in FIG. 5, is an actuating piston 51 of large cross-sectional area. The blast-valve piston 51 normally has high-pressure gas on both the front surface 52 thereof and also on the rear surface 53 thereof. Since the region 54 (FIG. 5) immediately in front of the blast valve 46 is normally at a lower pressure, say 30 p.s.i.g. the high-pressure gas at 200 p.s.i.g. within the interior 55 of high-pressure reservoir 22 is effective to close the blast valve 46 against its annular valve seat 56, as shown in FIG. 5.

To effect the opening of the blast valve 46, during an opening operation of the circuit interrupter 1, means are provided to effect an exhausting, or a dumping, of high-pressure gas at 200 p.s.i.g. from the region 57, back of the piston 51, and out of the high-pressure reservoir 22. This is accomplished by the provision of a pilot valve 58, which is guided within a pilot-valve casing, or body 60, as more fully described hereinafter.

It was mentioned previously, during the description of FIG. 3, that during the opening operation of the circuit interrupter 1, the insulating operating rod 26 was moved toward the right, as viewed in FIG. 3. As shown in FIG. 5, it will be noted that the right-hand rod extremity 61 of the operating rod 26 is pinned, as at 62, to an actuating lever, generally designated by the reference numeral 63, which is rotatably mounted about a stationary pin 64. The actuating lever casting is shown more clearly in FIGS. 14 and 15 of the drawings. The actuating lever 63 has three integral arms associated therewith. A first integral arm 63A is pivotally connected to the rod end 61 of insulating operating rod 26. A second bifurcated arm 63B, integrally formed with lever 63, carries a thrust pin 65 between the legs 69 thereof, which makes abutting, or thrusting engagement with a pair of pilot-valve latches 66, 67, as more fully described hereinafter.

A third pair of integrally formed arms 63C has a pivotal connection at 68 (FIG. 4B) with a pair of links 70, the other ends of which are pivotally connected by pins 99 (FIG. 5) to the operating rods 37 of the ladder-shaped movable contact assemblage, generally designated by the reference numeral 71. As shown more clearly in FIG. 5, the pins 99 also accommodate guide rollers 71a, which roll within bores 89 formed within a guide casting 29. Note the sectional view of FIG. 10 in this connection.

In retrospect, the ladder-shaped movable contact assemblage 71 includes the two insulating operating rods 37 (FIG. 9), the three cross braces, or yokes 38, to the central portions of which are secured the rod-shaped movable contacts 35, and the spring seat 9 for the opening accelerating spring 23, which is compressed, or charged, in the closed-circuit position of the interrupter 1. This movable contact assemblage 71 moves as a unit, and is guided by suitable stationary guides 19, 29 (FIGS. 3 and 10) associated with the end castings 39, 45 respectively of the arc-extinguishing assemblage 7.

From the foregoing description, it will be apparent that counterclockwise rotative opening motion of the actuating lever 63 will effect, through the arms 63C, generally leftward movement of links 70 and leftward opening movement of the ladder-shaped movable contact structure 71.

The interconnection between the actuating lever 63 and the pilot valve 58 will now be described. As mentioned, the pilot valve 58 controls the exhausting, or dumping of high-pressure gas at 200 p.s.i.g. out of the region 57 in back of the blast-valve actuating piston 51. With reference to FIG. 5, it will be noted that the pilot valve 58 has a rod-shaped valve extension 72, which controls the passage of gas through an opening 73, associated with a high-pressure chamber 74, constituting a part of reservoir chamber 22, and connected therewith by a conduit 74A. As shown in FIG. 5, the high-pressure chamber 74 has a gas elbow connection, as at 75, connected with a high-pressure gas supply tube 76 of strong insulating material to an external high-pressure storage chamber, hereinafter described. The opening 73, therefore, interconnects the high-pressure region 74 at 200 p.s.i.g. with the region 57 to the rear of the blast-valve actuating piston 51.

The pilot valve 58 also has a valve stem 77, which is biased by a compression spring 78 so that the pilot valve 58 will be biased closed upon its annular seat 79. In this position, of course, intercommunication exists between high-pressure region 74 and region 57 in back of piston 51 to effect closing of blast valve 46. This is the position shown in FIG. 5.

A pilot-valve body 80 is provided, having a guide bore 81 to guide the pilot-valve stem 77. In addition, the pilot valve body 80 has a pair of frontward extending support plates 80A, as viewed more clearly in FIG. 12, which have a pin 82 extending therebetween, to pivotally mount a pilot-valve lever, generally designated by the reference numeral 83. FIGS. 11 and 12 collectively show more clearly the configuration of the pivotally mounted pilot-valve lever 83. As shown in these figures, the pilot-valve lever 83 is generally box-shaped in construction, having upwardly extending apertured lug portions 84 with openings 84A extending therethrough. A pin 85 extends through the openings 84A in lug portions 84, and supports a roller 86, which engages a head portion 87 of the pilot-valve stem 77.

The pilot-valve lever 83, in addition, has a rearwardly extending stop tail portion 88, which makes stopping engagement with a portion 90 of the pilot-valve body 80, thus limiting the counterclockwise rotative movement of pilot-valve lever 83.

Extending through the opening 91 (FIG. 11) of box-shaped pilot-valve lever 83 is a pair of cooperable pilot-valve latches 66, 67, to which reference has previously been made. As shown in FIGS. 5 and 13, each pilot valve latch 66, 67 has a hole drilled through the side wall thereof accommodating a pin 92 by a press fit. There is a pin 92 associated with each pilot-valve latch 66 or 67. Each pin 92 has pivotally connected thereon a spring plunger 93, movable within a spring cylinder 94, the upper end of which is pivotally mounted upon a pin 95, extending between the frontward extending support plates 80A of pilot-valve body 80. As more clearly shown in FIG. 5, a compression spring 96 is disposed within each of the two spring cylinders 94 between the lower end 97 thereof and a head portion 98 of the spring plunger 93. This will tend to bias each of the pilot-valve latches 66, 67 in an upward direction, as viewed in FIG. 5. The two pilot-valve latches 66, 67 are pivotally mounted, at their right-hand ends, about a movable pin 100, which passes through openings 101 provided in side lug portions 102 of the pilot-valve lever 83.

The operation of the pilot-valve operating mechanism, generally designated by the reference numeral 103, will now be described. During the opening operation of the circuit interrupter 1, that is, during counterclockwise rotative movement of actuating lever 63, the thrust pin 65 moves with bifurcated arm 63B, and engages one or the other of shoulder portions 104, 105 of pilot-valve latches 66, 67 respectively to effect the clockwise rotative motion of pilot-valve lever 83. This will cause the roller 86 to force the head portion 87 of valve stem 77 to the right, as viewed in FIG. 5, causing pilot valve 58 to move away from its seat 79 and to close the opening 73, as indicated in FIG. 4B of the drawings.

The opening of pilot valve 58 will permit the high-pressure gas at 200 p.s.i.g. originally present within region 57 in back of blast-valve piston 51 to exhaust past valve seat 79 and out laterally provided exhaust openings 141 to the interior 106 of the tank structure 2. This will consequently effect a dumping of high-pressure gas out of region 57 and into the main body 106 of the tank 2 to thereby permit the high-pressure gas at 200 p.s.i.g. within region 55 of the high-pressure reservoir 22 to move piston 51 to the right, because its cross-sectional area is considerably greater than the cross-sectional area of the relatively small blast valve 46.

The consequent opening of blast valve 46 will permit high-pressure gas at 200 p.s.i.g. to flow through blast passage 44 and through insulating blast tubes 42, 43 into the several orifice structures 32 associated with the several arc-extinguishing units 18, 20 and 21.

As mentioned previously, this all occurs during the opening operation, when the actuating lever 63 has effected, through the rotation of its arms 63C, opening of the ladder-shaped movable contact structure 71. Although it takes a finite length of time before the gas blast passes through the blast tubes 42, 43 and into the orifice structures 32 of arc-extinguishing units 18 and 20, nevertheless, it also takes time for the arcing horn extensions 40 to pull out of the tubular movable contacts 35 to draw the arcs 33. The interrupting structures operates such as to draw the arcs 33 through the interrupting orifices 36 at a time when there is, in fact, a gas-blast flowing through the restricted orifices 36 at this time. The blast of gas, such as sulfur hexafluoride ($SF_6$), through the orifice restrictions 36 longitudinally of the arcs 33 effects rapid extinction thereof, and this exhausted gas passes into the region 106 internally of the tank structure 2. This region 106 constitutes, of course, a low-pressure region within tank 2 at 30 p.s.i.g., for example.

FIGS. 4A and 4B collectively show the position of the several parts of the pilot-valve operating mechanism 103 at the position where a stop pin 107, supported by plates 80A, engages the pilot-valve latch 66 and causes it to halt, thereby disengaging said pilot-valve latch 66 from the thrust pin 65, which continues to move with arm 63B to the fully open-circuit position of the interrupter 1, as illustrated fragmentarily by FIG. 6 of the drawings.

Thus, in the fully open-circuit position of the arc-extinguishing assemblage 7, as illustrated in FIG. 6, the thrust pin 65 has disengaged from the pilot valve latches 66, 67, the pilot valve 58 is closed, opening passage 73, and the admission of high-pressure gas through the opening 73 into region 57 in back of piston 51 has effected closure of the blast valve 46. As a result, in the fully open-circuit position of the circuit interrupter 1, blast valves 46 are closed, and the movable contact assemblages 71 of all three poles A, B and C are in their fully opened position, as indicated fragmentarily by the view in FIG. 6.

The stationary bumper 24, consisting of alternate steel and rubber washers, is struck by the spring plate 9 during the opening operation, and provides a cushioned stop. The bumper 24 is supported by stationary support rods 24a from the end support casting 39 and, as mentioned, acts in addition to a shock absorber disposed within housing 4 and associated with the operating mechanism disposed therein.

During the closing operation, the reciprocally movable shaft 3' enclosed within weatherproof housing tube 3, effects, by the means shown in FIG. 16, rotation of the several operating levers 28a of the pole units effecting tensile stress along each insulating operating rod 26, and rotating each actuating lever 63 in a clockwise direction about the stationary pivotal mounting 64.

The clockwise closing movement of actuating lever 63 not only effects contact closure through the links 70, but also relatching of the thrust pin 65, moving with arm 63B, with one or the other of pilot-valve latches 66, 67.

As more clearly shown in FIG. 7, the shoulder 105 of pilot-valve latch 67 is machined slightly to the right of shoulder portion 104 of pilot valve latch 66, so that if there is an incomplete closure of the contact structure, which would be followed by an opening operation, the pilot-valve latch 67 would effect opening of pilot valve 58, even though the front pilot-valve latch 66, as viewed in FIG. 7, had failed to latch with thrust pin 65. This situation is clearly illustrated in FIG. 7, where pilot-valve latch 66 has failed to engage thrust pin 65, but pilot-valve latch 67 has relatched, due to the extra clearance on shoulder portion 105.

In order to open the pilot valve 58 as soon as possible on the opening cycle, the distance between thrust pin 65 and shoulder portion 104 of pilot-valve latch 66 should be very short. The shorter this distance, the greater the possibility of maladjustment permitting an opening operation without the opening of pilot valve 58. To preclude this possibility, the second pilot-valve latch 67 is used, with a greater gap distance between thrust pin 65 and shoulder portion 105. This insures greater reliability, even though a slightly longer time may be required before pilot valve 58 opens.

In retrospect, in the closed-circuit position of each pole unit the electrical circuit extending therethrough includes the conductor stud, not shown, passing through terminal bushing 13, end support casting 39, contact fingers 34b, movable contact rod 35, contact fingers 41, contact fingers 34b, and onward, in like manner, to contact fingers 41 of right-hand arc-extinguishing unit 21. The circuit then extends through end casting 45 and through the high-pressure reservoir tank 22 to the right-hand terminal bushing 12.

During the opening operation, three arcs 33 are drawn within the three arc-extinguishing units 18, 20, 21. For various current and voltage ratings, the number of serially related arc-extinguishing units would vary to meet the requirements.

FIG. 8 shows a modification of the invention, wherein a metallic bellows 108 is attached to a plate 110 at one end, and to a plate 111 at the other end secured to the rotatable operating lever 25. Thus, instead of employing V-ring resilient gaskets about the operating shaft 28, as part of a gas-tight seal through the wall 5 of the tank structure 2, one may employ instead a metallic bellows 108 to effect a similar gas-tight seal between the interior 106 of tank structure 2 and the external ambient thereof. A modified fixed pivot shaft 120 would, of course, be employed in the modified construction of FIG. 8.

As illustrated in FIGS. 3, 9, 10 and 17, the several arc-extinguishing units 18, 20 and 21 are maintained in fixed position by a pair of longitudinally extending insulating support bars 112. The relatively stationary contact structures 34 are fixedly secured by bolted connections, not shown, to these support bars 112 of insulating material. In addition, to grade the electrostatic field between the high-voltage conducting parts of the arc-extinguishing assemblage 7 and the grounded inner walls of the tank structure 2, smoothly-shaped split metallic electrostatic shields 113 and a cylindrical shield 119 (FIG. 17) are employed to grade the voltage. This prevents the initiation of corona which might progressively result in a voltage breakdown between the high-voltage conducting parts of the arc-extinguishing assemblage 7 and the grounded inner wall 5 of the tank 2.

FIG. 18 is a schematic diagram of the 230 kv., 15,000 mva. circuit breaker gas system. It is to be understood that this voltage and interrupting capacity is given only by way of example, and that features of the present invention are applicable to lower, or to higher voltage and current ratings. In fact, the present circuit interrupter 1 is adaptable for a complete line of breakers for different voltages and current ratings, changes merely involving a different number of the arc-extinguishing units 18, 20, 21 and different spacing distances, which is necessary, of course, in the higher voltage ratings.

The gas system for the foregoing 230 kv. sulfur hexafluoride ($SF_6$) filled circuit breaker is a dual pressure, closed cycle system. The high pressure gas is provided to perform the arc interruption function. The function of the low pressure gas is to provide the dielectric strength between the energized parts and the grounded steel pole unit tanks. The high pressure system for a complete three-pole breaker consists of a thermally insulated reservoir 114 at ground potential, provided with heaters 115, and three high-pressure gas chambers 22, one inside each pole unit, at high potential. These high-pressure gas chambers 22 are an integral part of the arc-extinguishing assemblage 7, as previously described. The gas in these high-pressure chambers 22 is connected to the ground potential reservoir 114, within housing 4 (FIG. 1), through electrically insulated tubing 76.

The low pressure system consists of three gas-tight steel cylindrical pole unit tanks 2 with piping 109 to a compressor 116 used to maintain the pressure difference between the two systems. The dual pressures are maintained by auxiliary equipment located in the housing 4 at one end of the circuit breaker structure 1, as shown in FIG. 1. This equipment consists of a filter 117, compressor 116, a relief valve 118, hand valves 121–127, and various control and indicating instruments.

In the normal operation of this closed cycle gas system, as shown in FIG. 18, valves 121, 122 and 126 are open, and hand valves 123, 124, 125 and 127 are closed. During an opening operation of the circuit interrupter, the blast valve 46 in each of the high-pressure chambers 22 is opened and the gas flows to each of the three breaks in extinguishing units 18, 20 and 21, thereby performing the interrupting function. With the completion of the interrupting operation, and the reseating of the several blast valves 46, the high-pressure system will be at reduced pressure, and the low pressure system will have increased pressure. The initial conditions of the gas system will then be restored by operation of the compressor 116, which takes low-pressure gas from the circuit-interrupter, pole-unit tanks 2, through the filter 117, to remove any arc products, and then compresses it into the high-pressure reservoir 114 and high-pressure storage reservoirs 22.

In the contemplated fluid-blast circuit interrupter 1, the high-pressure reservoir 114 and the high-pressure chambers 22, within each of the tanks 2, will contain gas sufficient for two instantaneous operations. Within a short time interval the compressor 116 will restore the gas system to the initial conditions. The initial pressure conditions of the gas system call for a pressure in the high-pressure system of 200 p.s.i.g. at 45° F. and 30 p.s.i.g. in the low pressure system. Because of the relative volumes of the high-pressure and low-pressure systems, exchange of gas causes a large pressure drop in the high-pressure system, but only a small pressure rise in the low pressure system. In fact, complete pressure equilibrium will cause the low pressure to only rise approximately 15 p.s.i.g.

The instruments included in the auxiliary equipment may be separated into two groups, namely control instruments and indicating instruments. The control instruments consists of the motor governor switch 128, high-pressure system low-pressure alarm switch 130, high pressure system low-pressure cutout switch 131, low-pressure system, low-pressure alarm switch 132, and a low pressure system, low pressure compressor cut-out switch 140, high-pressure system low-temperature alarm switch 133 and a thermostat 134. Because of the constant volume type of gas system, the first five control instruments 128, 130–132, and 140 are special temperature-compensated pressure switches. This feature of the invention is set forth and claimed in United States patent application filed April 12, 1960, Serial No. 21,681 by Daniel H. McKeough and K. K. Franz, and assigned to the Canadian Westinghouse Company, Limited.

In effect, these switches 128, 130–132, 140 are sensitive to density changes. In a closed volume, any change in the system temperature will cause a proportional change in the pressure. However, the density of the gas in the low or high pressure system is not affected by temperature changes. Only the gain or loss of gas in a system can cause a change in density. Since pressure alone does not give a reliable measure of system conditions, as set forth in the aforesaid patent application by McKeough and Franz, temperature-compensated pressure switches are used. The use of these switches permits control of system pressures over an ambient temperature range from −50° F. to +150° F. FIG. 19 shows the constant specific volume (reciprocal of density) lines to which the various switches are sensitive.

The indicating instruments consist of two pressure gauges, 136, 137 and two temperature gauges 133 and 135. Other equipment includes the relief valve 118 and the filter 117.

The temperature-compensated pressure switch 128 regulates the pressure in the high-pressure system. In other words, this governor switch 128 operates to start the compressor motor 116 as soon as the density in the high-pressure system has reached a predetermined value. For this system a 10 p.s.i. drop in pressure below the normal pressure required for a particular temperature will start the compressor 116, and return the pressure to normal before stopping of the compressor 116. The operation of this switch could be the result of either a breaker operation or leakage of gas from the high-pressure system.

The temperature-compensated pressure switch 130 will operate an alarm in the event of low pressure in the high-pressure system, which is approaching a condition in which an operation may not be successful. This switch provides a warning should the compressor 116 fail to restore normal operating pressure.

To insure against the breaker attempting to operate when there is insufficient gas in the high-pressure system to make a successful operation, a temperature-compensated low-pressure cutout switch 131 is located in the high-pressure reservoir 114 and has its electrical contacts connected in the control circuit to provide either of two protecting schemes. In the first scheme, the breaker is prevented from being closed if it is in the open position, or from being tripped if it is in the closed position upon the event of low reservoir pressure. In the second scheme the breaker is either held or tripped to the open position. This condition of low reservoir pressure in reservoir 114 could result from failure of the compressor 116 to restore the proper operating conditions or malfunctioning of the relief valve 118 or blast valve 46. A temperature-compensated pressure switch 132, responsive to the low-pressure system, will operate an alarm in the event of loss of gas to the atmosphere to a point at which dielectric strength may be impaired. It is expected that with the loss of gas to a pressure of one atmosphere, the breaker will still be capable of withstanding twice line-to-ground voltage.

A temperature-compensated, low-pressure system, low-pressure, compressor cut-out switch 140 is provided. Its function is to prevent operation of the compressor 116 in the event of loss of gas, and subsequent low pressure, in the low-pressure system. This prevents further depletion of the gas in the low-pressure system in this eventuality.

The high-pressure system, low-temperature alarm 133 will sound a warning should the temperature of the high pressure reservoir tank 114 drop below the desired 42° F. value.

Four 1 kw. heaters 115, surrounding the high-pressure reservoir 114, are provided to prevent liquefaction of the high-pressure gas. Additional heat is provided by two 0.5 kw. heaters located in the control housing 4, not shown. A thermostat 134, located in the high-pressure reservoir 114, controls the four 1 kw. heaters 115 to maintain the high-pressure gas above the liquefaction temperature, which at 200 p.s.i.g. is 42° F. The gas in the high-pressure chambers 22 is heated by natural convection from the high-pressure reservoir 114. This heat source will also be supplemented by heat from the normal current flow in the breaker 1. The heat supplied by the heaters will be sufficient to maintain the breaker successfully operating at an ambient temperature of −50° F. The multiple heat sources provide a safety feature in the event of a failure of one source.

In the event of the temperature in the high-pressure reservoir 114 dropping below the liquefaction temperature for 200 p.s.i.g., an alarm 133 will be operated. Because of the characteristic of the gas and the system, there is a transition range in which liquefaction will not impair the interrupting function of the breaker. As liquefaction occurs, the pressure will drop, lowering the liquefaction temperature. At the minimum operating pressure of 160 p.s.i.g. the liquefaction temperature will be 30° F. A low-temperature alarm is not necessary on the low-pressure system, since at the low pressure of 25 p.s.i.g. the liquefaction temperature is −50° F.

The pressure gauges 136, 137 and the temperature gauges 133, 135 indicate conditions in the high- and low-pressure systems, and provide a quick visual inspection of the entire gas system.

A relief valve 118 is provided between the high and low-pressure systems to prevent overload of the compressor 116, and to prevent excessive pressure buildup in the high-pressure system in case of compressor-control failure.

A filter 117 on the intake side of the compressor 116, consisting of three activated alumina cartridges, will remove arced products from the sulfur hexafluoride ($SF_6$) gas.

Certain features of the foregoing gas-control system are described and claimed in United States patent application filed March 4, 1959, Serial No. 797,061 by Benjamin P. Baker and Daniel H. McKeough, and assigned to the assignee of the instant application.

In order to completely understand the advantages of a circuit interrupter, such as the type illustrated in FIG. 1, as applied to sulfur hexafluoride ($SF_6$) operation, review may be had of United States Patent 2,757,261, issued July 19, 1956 to Harry J. Lingal, Thomas E. Browne, Jr., and Albert P. Strom, and assigned to the assignee of the instant application. Briefly, the advantages of the use of sulfur hexafluoride ($SF_6$) may be realized from a consideration of the following:

Sulfur-hexafluoride ($SF_6$) is an extremely stable and inert gas with five times the density of air. It is one of the halogen compounds, and is not toxic. It remains a gas down to a temperature of minus 62° C. at normal atmospheric pressure, and it is comparable to oil in dielectric strength at only 30 p.s.i.g. pressure. The dielectric strength of $SF_6$ gas is two to three times that of air. The gas at atmospheric pressure can interrupt currents in the order of 100 times the value of those that can be interrupted in air with a plain break interrupter.

The phenomenal arc-quenching property of this electronegative gas is due to its strong affinity for electrons as exercised by the molecules of the gas. When an arc is drawn in this gas, the conducting electrons in the arc are captured by the gas, to form relatively immobile negative ions. This loss of conducting electrons causes the arc to become unstable and easily extinguished. A pressure flow of gas during the arcing period through the orifice structures 32 causes more intimate contact with the arc and more rapid absorption of the conducting electrons.

Gas deterioration caused by arcing has been found to be negligible. Mass spectrograph analysis fails to show appreciable changes in gas composition even after long periods of high-current arcing in smaller quantities of gas. A sealed breaker filled with $SF_6$ gas may be used for many operations without need of maintenance. Built-in activated aluminum filters 117 absorb the few arc products that do not recombine to $SF_6$ immediately after arcing.

From the foregoing description of the invention, it will be apparent that there is provided an improved and simplified operating arrangement for a high-voltage and high-power circuit interrupter. As compared to the aforesaid patent application of Friedrich and Lingal, it will be apparent that considerable simplification and compactness has been provided. Moreover, an improved gas-blast valve operating mechanism has been provided, which is of simple construction, and highly reliable in operation due, in part, to the application of two cooperable pilot-valve latches 66, 67.

The circuit interrupting structure is of minimum dimensions, and the provision of the gas supply conduit 76 into the high pressure chamber 74 provides a desired bracing of the entire interrupting assemblage 7 balancing the tensile and compressive forces exerted by the operation of the insulating operating rod 26. Thus, cantilever forces exerted on the lower ends 12A, 13A of the terminal bushings 12, 13 respectively are practically eliminated.

With the operating construction illustrated, multi-pole operation with simultaneous contact closure and opening in the several pole units A, B and C is achieved, with the avoidance of relaying difficulties.

Although particular advantage is obtained by the use of sulfur hexafluoride gas ($SF_6$), it is to be noted that certain features of the invention may be employed with other arc-extinguishing gases, such as selenium hexafluoride ($SeF_6$). The gases, sulfur hexafluoride ($SF_6$) or selenium hexafluoride ($SeF_6$), may be employed separately, or mixed together, or admixed with one of the gases air, carbon dioxide, nitrogen, argon, or helium. Since these gases are relatively expensive, it is desirable to utilize a minimum quantity of such gas, and for this reason the described tank structures are particularly useful.

In conclusion, it is to be noted that certain features of the interrupting structure and the gas-blast valve mechanism may be employed with a common arc-extinguishing gas, such as air, with particular advantage.

Although there has been illustrated and described a specific interrupting structure, it is to be clearly understood that the same was merely for the purpose of illustration, and that changes and modifications may readily be made therein by those skilled in the art, without departing from the spirit and scope of the invention.

We claim as our invention:

1. A fluid-blast circuit interrupter including a grounded exhaust tank, an arc-extinguishing assemblage disposed interiorly within said grounded exhaust tank, the arc-extinguishing assemblage including a plurality of serially related arc-extinguishing units and only a single high-pressure high-voltage reservoir chamber for storing high-pressure fluid, only a single blast valve for releasing high-pressure fluid from said high-voltage reservoir chamber toward said units, blast tube means leading from said single blast valve to each of the arc-extinguishing units, and the grounded exhaust tank functioning to collect used arc-extinguishing fluid for the subsequent recompression thereof.

2. The combination in a fluid-blast circuit interrupter of a generally elongated arc-extinguishing assemblage and a surrounding grounded exhaust tank, the arc-extinguishing assemblage including a plurality of serially related arc-extinguishing units and a single high-pressure high-voltage reservoir chamber containing high-pressure fluid disposed adjacent one end of said generally elongated arc-extinguishing assemblage, only a single blast valve for controlling the exhausting of high-pressure fluid out of said high-voltage high-pressure reservoir chamber, blast passage means leading from said single blast valve to each arc-extinguishing unit, and the grounded exhaust tank functioning to collect used arc-extinguishing fluid for the subsequent recompression thereof.

3. A fluid-blast circuit interrupter including a grounded exhaust tank structure, a pair of spaced terminal bushings extending interiorly within said grounded exhaust tank structure, a generally elongated arc-extinguishing assemblage continuously extending between and electrically bridging the spaced interior ends of said spaced terminal bushings, the arc-extinguishing assemblage including a plurality of serially related arc-extinguishing units, a single high-pressure high-voltage reservoir chamber containing high-pressure fluid disposed adjacent one end of said generally elongated arc-extinguishing assemblage, a single blast valve for controlling the exhausting of high-pressure fluid out of said high-pressure high-voltage reservoir chamber, blast passage means leading from said blast valve to each arc-extinguishing unit, and the grounded exhaust tank structure functioning to collect used arc-extinguishing gas for the subsequent recompression thereof.

4. The combination in a fluid-blast circuit interrupter of a generally elongated exhaust tank structure at ground potential, a pair of spaced terminal bushings extending generally upwardly out of said generally elongated exhaust tank structure adjacent opposite ends thereof, a generally elongated arc-extinguishing assemblage substantially wholly supported from the interior ends of said spaced pair of terminal bushings and continuously bridging the same, the arc-extinguishing assemblage including a plurality of serially related arc-extinguishing units and a single high-pressure high-voltage reservoir chamber containing high-pressure fluid disposed adjacent one end of said generally elongated arc-extinguishing assemblage, a single blast valve for controlling the exhausting of high-pressure fluid out of said high-pressure high-voltage reservoir chamber, blast passage means leading from said single blast valve to each arc-extinguishing unit, and the grounded exhaust tank structure functioning to collect used arc-extinguishing gas for the subsequent recompression thereof.

5. The combination in a fluid-blast circuit interrupter of a generally elongated exhaust tank structure at ground potential, a pair of spaced terminal bushings extending generally upwardly out of said generally elongated exhaust tank structure adjacent opposite ends thereof, a generally elongated continuous arc-extinguishing assemblage substantially wholly supported from the interior ends of said spaced pair of terminal bushings, the arc-extinguishing assemblage including a plurality of serially related arc-extinguishing units which continuously electrically bridge the spaced inner ends of the terminal bushings, a single high-pressure high voltage reservoir chamber disposed at one end of said arc-extinguishing assemblage adjacent the interior end of one terminal bushing and constituting a portion of the same, a single blast valve associated with said single high-pressure reservoir chamber to control the exhausting of high-pressure fluid therefrom, an operating crank at ground potential disposed adjacent the interior end of the other terminal bushing, operating means extending through the wall of said tank structure for rotating said operating crank, blast passage means extending from said single blast valve to each of said plurality of serially related arc-extinguishing units, and a blast-valve mechanism including an elongated insulating operating rod extending generally diagonally along said tank structure and connected to said operating crank.

6. A fluid-blast circuit interrupter including separable contact means for establishing an arc, a high-pressure reservoir chamber for storing fluid under pressure, blast passage means extending between said high-pressure reservoir and said separable contact means, a blast valve having a piston secured thereto controlling the flow of high-pressure fluid along said blast passage means toward the separable contact means, means for effecting an opening operating of said blast valve including dumping means, said dumping means including a two-way-acting pilot valve, the pilot valve being operable in one position to admit high pressure gas back of said piston and operable in the other position to exhaust gas from in back of said piston, a pivotally mounted pilot-valve lever for opening said pilot valve, a pilot-valve latch supported by said pivotally mounted pilot-valve lever, a pivotally mounted actuating lever, and a thrust member carried by said actuating lever and making releasable engagement with said pilot-valve latch.

7. A fluid-blast circuit interrupter including separable contact means for establishing an arc, a pivotally mounted actuating lever, means interrelating rotative motion of said actuating lever with opening and closing motion of said separable contact means, a high-pressure reservoir chamber for storing fluid under pressure, blast passage means extending between said high pressure reservoir and said separable contact means, a blast valve having a piston secured thereto controlling the flow of high-pressure fluid along said blast passage means toward the separable contact means, means for effecting an opening operation of said blast valve including dumping means, said dumping means including a two-way-acting pilot valve, the pilot valve being operable in one position to admit high pressure gas back of said piston and operable in the other position to exhaust gas from in back of said piston, a pivotally mounted pilot-valve lever for opening said pilot valve, a pilot-valve latch supported by said pivotally mounted pilot-valve lever, and a thrust member carried by said actuating lever and making releasable engagement with said pilot-valve latch.

8. A fluid-blast circuit interrupter including separable contact means for establishing an arc, a high-pressure reservoir chamber for storing fluid under pressure, blast passage means extending between said high-pressure reservoir and said separable contact means, a blast valve controlling the flow of high-pressure fluid along said blast passage means toward the separable contact means, means for effecting an opening operation of said blast valve including dumping means, said dumping means including a pilot valve, a pivotally mounted pilot-valve lever for opening said pilot valve, a pair of pilot-valve latches having different engaging portions supported by said pivotally mounted pilot-valve lever, a pivotally mounting actuating lever, and a thrust member carried by said actuating lever and making releasable thrusting engagement with one or the other of said pilot-valve latches during the opening operation to effect opening of the blast valve.

9. A fluid-blast circuit interrupter including a grounded tank structure adaptable for collecting gas, a pair of spaced terminal bushings extending interiorly within said grounded tank structure, an arc-extinguishing assemblage substantially wholly supported from the interior ends of said spaced pair of terminal bushings, said arc-extinguishing assemblage continuously extending and electrically bridging the interior ends of said bushings in the closed position, an insulating operating rod extending from the wall of said grounded tank structure to said arc-extinguishing assemblage to effect the opening and closing operations thereof, a high-pressure high-voltage storage tank for storing high-pressure fluid forming a part of said arc-extinguishing assemblage, and a strong fluid-supply line positioned close to said operating rod and extending from a wall of said grounded tank structure to said high-pressure storage tank to brace the same and minimize cantilever stresses exerted upon the terminal bushings by operation of said insulating operating rod.

10. The combination in a fluid-blast circuit interrupter of an elongated grounded exhaust tank structure at relatively low pressure, a pair of spaced upstanding terminal bushings extending downwardly into said elongated grounded tank structure, an elongated arc-extinguishing assemblage supported from and bridging the interior ends of said spaced pair of terminal bushings, a high-pressure high-voltage reservoir tank disposed adjacent one end of said elongated arc-extinguishing assemblage for storing high-pressure fluid for arc-interruption purposes, a diagonally extending insulating operating rod extending between the wall of said grounded tank structure and the arc-extinguishing assemblage to effect the opening and closing operations thereof, and a strong insulating fluid-supply tube positioned close to said operating rod and extending from the tank wall to said high-pressure reservoir tank to brace the arc-extinguishing assemblage and minimize cantilever stresses being exerted upon the lower ends of the pair of terminal bushings.

11. The combination in a gas-blast circuit interrupter of separable contact means for drawing an arc, means for blasting an arc-extinguishing gas against said arc including a high-pressure gas storage tank and a main blast valve for controlling the blast of gas issuing from the high pressure storage tank, an actuating piston, a piston rod connecting the main blast valve with said actuating piston, dump-valve means for exhausting the gas pressure from one side of said actuating piston including a pilot-valve assembly, the pilot-valve assembly including a two-way-acting pilot valve, the pilot valve being operable in one position to admit gas under pressure in back of said actuating piston and operable in the other position to dump gas from in back of said actuating piston, means for opening said pilot-valve assembly including a pivotally mounted pilot-valve lever and a pivotally mounted actuating lever, linkage means interconnecting the pivotally mounted actuating lever with said separable contact means, a thrust member carried by said actuating lever, a pilot-valve latch carried by said pilot-valve lever, and the thrust member making detachable engagement with said pilot-valve latch during the opening rotative movement of the actuating lever.

12. The combination in a gas-blast circuit interrupter of separable contact means for drawing an arc, means for blasting an arc-extinguishing gas against said arc including a high-pressure gas storage tank and a main blast valve for controlling the glast of gas issuing from the high pressure storage tank, an actuating piston, a piston rod connecting the main blast valve with said actuating piston, dump valve means for exhausting the gas pressure from one side of said actuating piston including a pilot-valve assembly, means for opening said pilot-valve assembly including a pivotally mounted pilot-valve lever and a pivotally mounted actuating lever, linkage means interconnecting the pivotally mounted actuating lever with said separable contact means, a thrust member carried by said actuating lever, a pair of pilot-valve latches pivotally mounted upon the pivotally mounted pilot-valve lever, and the thrust member making momentary latching engagement with one or the other of said pilot-valve latches to effect thereby opening of the pilot-valve assembly and hence opening of the main blast valve during the opening operation of the interrupter.

13. The combination in a gas-blast circuit interrupter of separable contact means for drawing an arc, means for blasting an arc-extinguishing gas against said arc including a high-pressure gas storage tank and a main blast valve for controlling the blast of gas issuing from the high pressure storage tank, an actuating piston, a piston rod connecting the main blast valve with said actuating piston, dump valve means for exhausting the gas pressure from one side of said actuating piston including a pilot-valve assembly, the pilot-valve assembly including a two-way-acting pilot valve, the pilot valve being operable in one position to admit gas under pressure in back of said actuating piston and operable in the other position to dump gas from in back of said actuating piston, means for opening said pilot-valve assembly including a pivotally mounted pilot-valve lever and a pivotally mounted actuating lever, linkage means interconnecting the pivotally mounted actuating lever with said separable contact means, a thrust member carried by said actuating lever, a pilot-valve latch carried by said pilot-valve lever, the thrust member making detachable engagement with said pilot-valve latch during the opening rotative movement of the actuating lever, and a stop member striking said pilot-valve latch at a predetermined point in the opening stroke of the interrupter to break the connection between said thrust member and the pilot-valve latch.

14. The combination in a gas-blast circuit interrupter of separable contact means for drawing an arc, means for blasting an arc-extinguishing gas against said arc including a high-pressure gas storage tank and a main blast valve for controlling the blast of gas issuing from the high-pressure storage tank, an actuating piston, a piston rod connecting the main blast valve with said actuating piston, dump-valve means for exhausting the gas pressure from one side of said actuating piston including a pilot-valve assembly, means for opening said pilot-valve assembly including a pivotally mounted pilot-valve lever, and a pivotally mounted actuating lever, linkage means interconnecting the pivotally mounted actuating lever with said separable contact means, a thrust member carried by said actuating lever, a pair of pilot-valve latches pivotally mounted upon the pivotally mounted pilot-valve lever, the thrust member making momentary latching engagement with one or the other of said pilot-valve latches to effect thereby opening of the pilot-valve assembly and hence opening of the main blast valve during the opening operation, and a stop member striking said pilot-valve latch at a predetermined point in the opening stroke of the interrupter to break the connection between said thrust member and the pilot-valve latch.

15. A gas-blast circuit interrupter including an elongated tank at relatively low pressure having a pair of spaced terminal bushings extending therein, an elongated arc-extinguishing assemblage substantially wholly supported by the interior ends of said spaced pair of terminal bushings and continuously bridging the same, a high-pressure high-voltage storage tank disposed adjacent one end of said arc-extinguishing assemblage and constituting a portion thereof, and an insulating operating rod and a substantially parallel disposed gas-supply line extending diagonally from the wall of the elongated tank to the vicinity of said high-pressure high-voltage storage tank to balance the compressive and tensile forces exerted during circuit interrupter operation.

16. A high-power gas-blast circuit interrupter including a grounded tank containing gas at a relatively low pressure but higher than atmospheric pressure, a pair of terminal bushings extending into said grounded tank and substantially wholly supporting a continuously extending arc-extinguishing assemblage between their interior ends, a single high-pressure high-voltage gas-storage tank disposed adjacent one end of said arc-extinguishing assemblage and constituting a portion of the same, a single main blast valve associated with said high-pressure high-voltage gas-storage tank, the arc-extinguishing assemblage including a plurality of serially related arc-extinguishing units, and a separate blast tube connecting each arc-extinguishing unit with the main blast valve associated with the high-pressure storage tank.

17. A high-power gas-blast circuit interrupter including a grounded tank containing gas at a relatively low pressure but greater than atmospheric pressure, a pair of terminal bushings extending into said grounded tank and substantially wholly supporting a continuously extending arc-extinguishing assemblage between their interior ends, a single high-pressure high-voltage gas-storage tank disposed adjacent one end of said arc-extinguishing assemblage and constituting a portion of the same, a single main blast valve associated with said single high-pressure high-voltage gas storage tank, the arc-extinguishing assemblage including a plurality of serially related orifice-type arc-extinguishing units, a separate blast tube connecting each arc-extinguishing unit with the main blast valve, and the high-pressure gas exhausting through the orifice-type arc-extinguishing units into the main body of the grounded tank during an opening operation to be collected therein.

18. A high-power gas-blast circuit interrupter including a grounded tank containing gas at a relatively low pressure but greater than atmospheric pressure, a pair of terminal bushings extending into said grounded tank and substantially wholly supporting a continuously extending arc-extinguishing assemblage between their interior ends, a single high-pressure high-voltage gas-storage tank disposed adjacent one end of said arc-extinguishing assemblage and constituting a portion of the same, a single main blast valve associated with said high-pressure gas storage tank, the arc-extinguishing assemblage including a plurality of serially related orifice-type arc-extinguishing units, a separate blast tube connecting each arc-extinguishing unit with the single main blast valve, the high-pressure gas exhausting through the orifice-type arc-extinguishing units into the main body of the grounded tank during an opening operation, and a compressor for circulating the gas from the relatively low pressure to the high pressure within said high-pressure gas-storage tank.

19. A gas-blast circuit interrupter including one or more pairs of serially related separable contacts, an operating mechanism for effecting the separation of said one or more pairs of serially related separable contacts, said operating mechanism including a movable operating rod, an accelerating spring for biasing said movable operating rod to move in an opening direction, a high-pressure gas-storage tank having a main blast valve associated therewith, said blast valve having an actuating piston secured thereto, a pilot-valve assembly for effecting the opening of said main blast valve during the opening operation of the circuit interrupter, the pilot-valve assembly including a two-way-acting pilot wave, the pilot valve being operable in one position to admit gas under pressure in back of said actuating piston and operable in the other position to dump gas from in back of said actuating piston, and means for first concentrating the energy of said accelerating spring on opening the pilot-valve assembly and subsequently transferring the energy of the accelerating spring to effect subsequent accelerating opening motion of said separable contacts.

20. A multiple-break compressed-gas circuit interrupter including a grounded metallic tank having a pair of spaced terminal bushings extending therein, an arc-extingushing assemblage continuously extending between the spaced inner ends of the terminal bushings and substantially wholly supported thereby, said continuously-extending arc-extinguishing assemblage including a plurality of serially related orifice-type arc-extinguishing units disposed in end-to-end relation, at least one of the orifice-type arc-extinguishing units having a relatively stationary contact structure having a rearwardly projecting split contact-finger assembly, a movable generally ladder-shaped contact assembly including a pair of longitudinally extending insulating operating rods having one or more cross-braces therebetween, a movable rod-shaped contact secured to the midpoint of the cross-brace, the cross-brace moving longitudinally through said split contact-finger assembly with the contact fingers thereof bearing upon the movable rod-shaped contact secured thereto, the contact arrangement functioning to transfer current from the rod-shaped movable contact to the relatively stationary contact structure.

21. A multiple-break compressed-gas circuit interrupter including a grounded metallic tank having a pair of spaced terminal bushings extending therein, an arc-extinguishing assemblage continuously extending between the spaced inner ends of the terminal bushings and substantially wholly supported thereby, said continuously-extending arc-extinguishing assemblage including a plurality of serially related orifice-type arc-extinguishing units disposed in end-to-end relation, a plurality of the serially related orifice-type arc-extinguishing units having relatively stationary contact structures, each of said relatively stationary contact structures having a rearwardly extending split contact-finger assembly, a movable generally ladder-shaped contact assembly including a pair of longitudinally extending insulating operating rods having a plurality of cross-braces therebetween each of which has a rod-shaped movable contact secured adjacent its midpoint, the cross-braces moving between the split finger assemblies with the contact fingers of the split finger assemblies bearing upon the rod-shaped movable contacts, the foregoing contact arrangement functioning to transfer the current in a serial manner from one rod-shaped movable contact through the contact fingers of the split contact-finger assembly to the relatively stationary contact structure of the associated arc-extinguishing unit, and in like manner along the multiple-break circuit interrupter.

22. A multiple-break compressed gas circuit interrupter including a grounded metallic tank having a pair of spaced terminal bushings extending therein, an arc-extinguishing assemblage continuously extending between the spaced inner ends of the terminal bushings and substantially wholly supported thereby, said continuously-extending arc-extinguishing assemblage including a plurality of serially related orifice-type arc-extinguishing units disposed in end-to-end relation, at least one of the orifice-type arc-extinguishing units having a relatively stationary contact structure having a rearwardly projecting split contact finger assembly, a movable generally ladder-shaped contact assembly including a pair of longitudinally extending insulating operating rods having one or more cross-braces therebetween, a movable rod-shaped contact secured to the midpoint of the cross-brace, the cross-brace moving longitudinally through said split contact finger assembly with the contact fingers thereof bearing upon the movable rod-shaped contact secured thereto, the contact arrangement functioning to transfer current from the rod-shaped movable contact to the relatively stationary contact structure, and one or more longitudinally extending insulating support rods to fixedly secure the plurality of arc-extinguishing units in spaced relation.

23. A multiple-break compressed gas circuit interrupter including a grounded metallic tank having a pair of spaced terminal bushings extending therein, an arc-extinguishing assemblage continuously extending between the spaced inner ends of the terminal bushings and substantially wholly supported thereby, said continuously-extending arc-extinguishing assemblage including a plurality of serially related orifice-type arc-extinguishing units disposed in end-to-end relation, a plurality of the serially related orifice-type arc-extinguishing units having relatively stationary contact structures, each of said relatively stationary contact structures having a rearwardly extending split contact finger assembly, a movable generally ladder-shaped contact assembly including a pair of longitudinally extending insulating operating rods having a plurality of cross-braces therebetween each of which has a rod-shaped movable contact secured adjacent its midpoint, the cross-braces moving between the split finger assemblies with the contact fingers of the split finger assemblies bearing upon the rod-shaped movable contacts, the foregoing contact arrangement functioning to transfer the current in a serial manner from one rod-shaped movable contact through the contact fingers of the split contact finger assembly to the relatively stationary contact structure of the associated arc-extinguishing unit, and in like manner along the multiple-break circuit interrupter, and one or more longitudinally extending insulating support rods to fixedly secure the plurality of arc-extinguishing units in spaced relation.

24. A multi-break gas-blast circuit interrupter including a grounded metallic exhaust tank, a pair of spaced terminal bushings extending interiorly within said grounded exhaust tank, a multi-break elongated arc-extinguishing assemblage continuously bridging the interior ends of said spaced terminal bushings and electrically bridging the same in the closed-circuit position of the interrupter, said bushings substantially wholly supporting the weight of the arc-extinguishing assemblage, the assemblage including a movable contact structure linearly movable lengthwise of the assemblage to open and closed-circuit positions, only a single high-pressure reservoir at high potential and constituting a portion of the arc-extinguishing assemblage, said reservoir disposed adjacent one end of the assemblage and having a blast valve associated therewith, said assemblage including a plurality of serially-related gas-blast arc-extinguishing units, said movable contact structure including a plurality of spaced movable contacts movable linearly longitudinally of the assemblage, each movable contact establishing an arc within an arc-extinguishing unit, operating means including an operating rod for actuating said movable contact structure to the open and closed-circuit positions, blast-valve actuating means responsive to operation of said operating means for synchronizing opening of said blast valve to cause timed blasts of gas from said reservoir to the plurality of units, and blast-tube means interconnecting the outlet side of the blast valve with the individual gas-blast arc-extinguishing units, whereby each unit receives a blast of gas for arc-extinguishing purposes.

25. The multi-break gas-blast circuit interrupter of claim 24, wherein an accelerating-spring assembly is disposed adjacent the other end of the assemblage to bias the movable contact structure to the open-circuit position.

26. The multi-break gas-blast circuit interrupter of claim 24, wherein said operating rod extends diagonally to the wall of the tank adjacent the other end of the assemblage, and a high-pressure gas feed tube leads to said reservoir also generally diagonally to counteract stresses imposed on the bushings by operation of said rod.

27. The multi-break gas-blast circuit interrupter of claim 24, wherein said movable contact structure includes a generally ladder-shaped device comprising a spaced pair of movable insulating actuating rods, bridging cross-members, and said spaced movable contacts being affixed adjacent the mid-portions of the cross-members.

28. The combination in a dual-pressure closed-gas-system type of gas-blast circuit interrupter of a generally cylindrical elongated metallic grounded exhaust tank having a spaced pair of high-voltage terminal bushings extending upwardly therefrom adjacent opposite ends thereof, means defining an elongated arc-extinguishing assemblage disposed substantially coaxially of said cylindrical exhaust tank and substantially wholly supported by the interior ends of said spaced terminal bushings, said assemblage continuously electrically bridging the interior ends of the bushings in the closed circuit position, a single high-voltage high-pressure reservoir constituting a portion of the assemblage and disposed adjacent one end thereof, accelerating spring means disposed adjacent the other end of the assemblage, said assemblage including a plurality of spaced movable contacts collectively biased to the open-circuit position by said accelerating spring means, a plurality of spaced relatively stationary contacts, operating means for said assemblage including an insulating operating rod extending to the tank wall and serving to close the contacts under tension and charge said accelerating spring means, high-voltage blast-valve means including a blast valve associated with said reservoir, means synchronizing opening of the blast-valve means with said operating means for obtaining a timed blast of gas for arc-extinguishing purposes, compressor means for compressing gas at relatively low pressure from said exhaust tank to a higher pressure level and force it under pressure back into said high-voltage reservoir, and insulating structure constituting a portion of the assemblage and fixedly supporting in spaced relationship a plurality of gas-blast arc-extinguishing units, each of said spaced movable contacts being cooperable with a relatively stationary contact to draw an arc within one of the gas-blast arc-extinguishing units to receive said blast of gas, and the exhausted gas being collected in the general interior of the exhaust tank.

29. The combination according to claim 28, wherein said spaced movable contacts are supported on a generally ladder-shaped frame movable linearly longitudinally of the arc-extinguishing assemblage.

30. The combination according to claim 29, wherein said high-voltage blast-valve means includes a rotatable actuating lever rotated by said insulating operating rod, the actuating lever is linked to the generally ladder-shaped frame, and opening movement of the ladder-shaped frame as effected by said accelerating spring means rotates said lever to open the blast valve for the extinguishing flow of gas.

31. The combination according to claim 29, wherein the rear extension of one or more relatively stationary contacts guides the movement of the adjoining one or more movable contacts.

References Cited in the file of this patent

UNITED STATES PATENTS

| | | |
|---|---|---|
| 1,922,862 | Prince | Aug. 15, 1933 |
| 2,473,892 | Ludwig et al. | June 21, 1949 |
| 2,525,470 | Baker et al. | Oct. 10, 1950 |
| 2,668,217 | Vogelsanger et al. | Feb. 2, 1954 |
| 2,675,446 | Umphrey | Apr. 13, 1954 |
| 2,816,991 | Friedrich | Dec. 17, 1957 |
| 2,824,937 | Strom | Feb. 25, 1958 |
| 2,866,045 | Leeds | Dec. 23, 1958 |

FOREIGN PATENTS

| | | |
|---|---|---|
| 592,686 | Germany | Feb. 12, 1934 |
| 605,163 | Great Britain | July 16, 1948 |
| 609,207 | Great Britain | Sept. 28, 1948 |
| 626,842 | Great Britain | July 21, 1949 |
| 963,442 | Germany | May 9, 1957 |